United States Patent [19]
Chen et al.

[11] Patent Number: 5,616,839
[45] Date of Patent: Apr. 1, 1997

[54] APPARATUS AND METHOD FOR MEASURING CONTACT FORCE DISTRIBUTION OF A TIRE

[75] Inventors: Fang Chen, Rochester Hills; Christopher T. Griffen, Dearborn; Eel-Jeu Ni, Troy, all of Mich.

[73] Assignee: Ford Motor Company, Dearborn, Mich.

[21] Appl. No.: 593,762

[22] Filed: Jan. 29, 1996

[51] Int. Cl.⁶ ................................................. G01M 17/02
[52] U.S. Cl. ........................................... 73/146; 356/71
[58] Field of Search ................................ 73/146; 356/71

[56] References Cited

U.S. PATENT DOCUMENTS

| | | |
|---|---|---|
| 3,861,208 | 1/1975 | Lippmann et al. . |
| 4,095,464 | 6/1978 | Breedijk . |
| 4,428,670 | 1/1984 | Ruell et al. ................. 356/71 |
| 4,600,016 | 7/1986 | Boyd et al. . |
| 4,858,621 | 8/1989 | Franks . |
| 5,088,321 | 2/1992 | Kajikawa et al. . |
| 5,092,166 | 3/1992 | Wada et al. . |
| 5,111,687 | 5/1992 | Hill ............................ 73/146 |
| 5,172,590 | 12/1992 | Adachi et al. . |
| 5,289,718 | 4/1994 | Mousseau . |
| 5,347,588 | 9/1994 | Wilson . |
| 5,357,799 | 10/1994 | Roth et al. . |

OTHER PUBLICATIONS

SAE Technical Paper 851627, Sep. 1985 "Application of the Contact Pressure Display (CPD) Method to Tire Mechanics" (Chananel Kvatinsky et al.).
2545 Int'l Soc'y Optical Engineering Proc. 33 (1995) "Pulsed Holographic Interferometry in Predictive Tire Testing" (Piotr J. Wesolowski et al.).

*Primary Examiner*—Richard Chilcot
*Assistant Examiner*—Joseph L. Felber
*Attorney, Agent, or Firm*—Neil P. Ferraro

[57] ABSTRACT

An apparatus and method for measuring full-field contact force distribution of a tire. A transparent, elastically deformable contact member having an elasticity substantially less than the elasticity of the tire is supported by a transparent rigid support member. As the tire is pressed into the contact member, the contact member deforms. Laser light illuminates the tire-contact member interface and is reflected to an imaging device which measures the displacement of the tire-contact member interface using interferometry principles. Because the elasticity of the contact member is known, the contact force distribution of the tire may be calculated. The apparatus and method may also be used to measure three-dimensional as well as dynamic contact force displacement.

19 Claims, 3 Drawing Sheets

APPARATUS AND METHOD FOR MEASURING CONTACT FORCE DISTRIBUTION OF A TIRE

FIELD OF THE INVENTION

The present invention relates to an apparatus and method for measuring the full-field contact force distribution of a tire by means of a substantially smooth, transparent contact member combined with a visual imaging means.

BACKGROUND OF THE INVENTION

Automotive engineers have placed continued emphasis on the reduction of vehicle noise, vibration and harshness (NVH), to ensure a smooth vehicle operation. Tire performance is a key factor in controlling vehicle NVH. To that end, it is desirable to obtain tire contact force distribution data so that the data may be used in computer modeling to improve overall vehicle NVH.

A typical apparatus for measuring tire contact force distribution, as disclosed in Chananel Kvatinsky et al., "Application of the Contact Pressure Display (CPD) Method to Tire Mechanics", SAE Technical Paper 851627, Sep. 1985, employs a multiplicity of pressure sensors embedded in a tire contact member such that when the tire is pressed onto the pressure sensors, the contact force distribution may be determined. Discrete pressure sensors, being located at discrete positions in the contact member, do not provide a full-field display to determine the contact force distribution throughout the entire footprint. It is to be appreciated that "footprint" means that portion of the tire in contact with the contact member.

FIG. 1 shows the results of the contact force distribution of a tire using the prior art contact pressure display apparatus described above. As shown in FIG. 1, a grid of circles, 2, represents the pressure distribution of the tire. The circles represent positions where the tire surface contacts the apparatus. Thus, voids 4 between circles 2 represent areas where no data is obtained. As a result, this apparatus lacks full-field capability. In addition, this prior art apparatus might result in error caused by stress concentration because the apparatus measures only normal forces at discrete points.

Another apparatus for measuring displacement, as disclosed in Piotr J. Wesolowski et al., "Pulsed Holographic Interferometry in Predictive Tire Testing", 2545 Int'l Soc'y Optical Engineering Proc. 33 (1995), uses pulsed holographic interferometry. FIG. 2 represents the results using this prior art apparatus. Contour lines 6 represent lines of constant tire displacement normal to the footprint plane. Because the tire is pressed against a rigid surface, the displacement of the tire in the area defined by the contact patch 8 is constant. That is why FIG. 2 shows a single contour plane at the tire contact patch 8. To measure full-field contact force, i.e. the distribution force of the tire in the contact patch, there must be a variation in tire displacement in the contact patch. According to this prior art apparatus, there is no variation in displacement in the contact patch due to the tire being pressed against a rigid surface, and therefore this prior art apparatus lacks full-field capability.

A third prior art apparatus for measuring contact force distribution is disclosed in U.S. Pat. No. 5,092,166. The apparatus of the '166 patent uses a television camera to measure the deformation of elastic projections resulting from pressing of the tire onto a light-colored elastic sheet. The elastic projections are semispherical in shape and extend from the sheet. The sheet is disposed between a glass plate and the tire and, as the tire presses into the sheet, the projections deform. The camera records the amount of deformation to determine the contact force. However, since the projections are semispherical in shape, there must be voids between the projections. As a result, no contact force information can be obtained at these locations. Thus, this prior art apparatus also lacks full-field capability.

SUMMARY OF THE INVENTION

An object of the invention claimed herein is to provide an apparatus and method for measuring contact force distribution of a tire in full-field.

The above objective is achieved, and the problems of prior approaches overcome, by an apparatus and method for measuring full-field contact force distribution of a tire. In one particular aspect of the present invention, an apparatus uses a transparent, elastically deformable contact member, such as an elastomer or a fluid filled transparent bag, having a substantially smooth first surface and which is supported by a transparent, rigid, support member. The contact member has an elasticity which is substantially less than the elasticity of the tire, whereas the support member has an elasticity which is substantially greater than the elasticity of the tire. The apparatus further includes an excitation source which is coupled to the tire for pressing the tire surface against the transparent contact member. A laser light source is positioned to illuminate the interface between the tire and contact member through the support member and the contact member. An imaging device is also positioned to receive reflected light from the interface. The imaging device measures the displacement of the interface when the tire surface is pressed against the contact member. With the known elasticity of the contact member, the displacement is translated by computational means to determine the full-field contact force distribution of the tire.

Accordingly, an advantage of the above aspect of the invention is that a full-field contact force distribution may be obtained.

Another advantage of the above aspect of the invention is that an apparatus and method is provided that is simple to set up and to acquire displacement data.

Still another advantage of the above aspect of the invention is that dynamic contact force distribution can be measured.

Yet another advantage of the above aspect of the invention is that three-dimensional contact force distribution can be obtained.

Other objects, features and advantages of the present invention will be readily appreciated by the reader of this specification.

BRIEF DESCRIPTION OF THE DRAWINGS

The invention will now be described, by way of example, with reference to the accompanying drawings, in which.

DETAILED DESCRIPTION OF THE PREFERRED EMBODIMENTS

Figure 1:
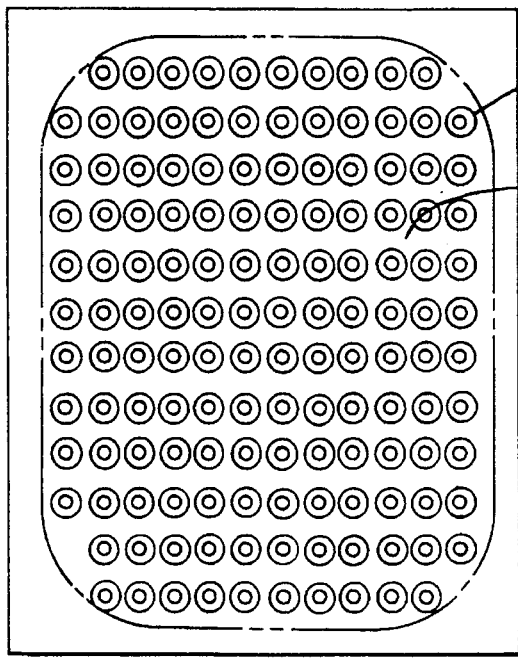
FIG. 1 is a diagrammatic representation of tire contact force distribution resulting from a prior art apparatus.
Figure 2:
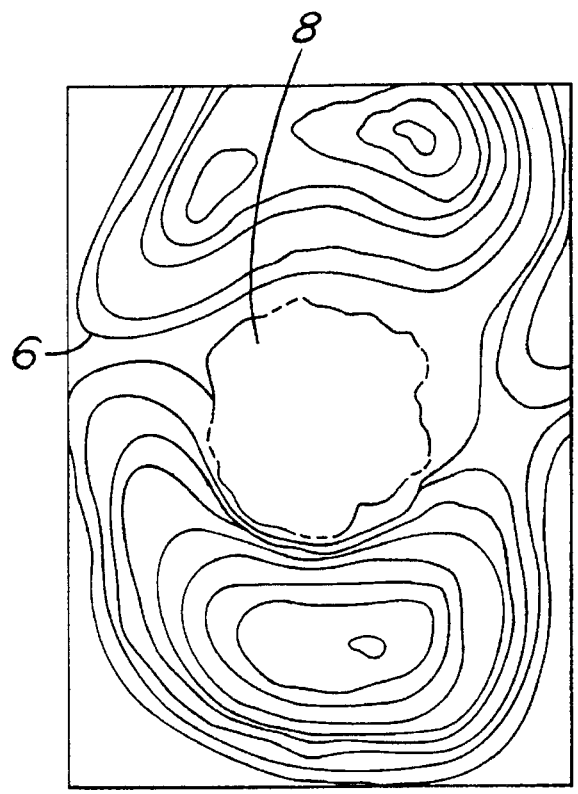
FIG. 2 is a diagrammatic representation of tire displacement resulting from another prior art apparatus.
Figure 3:
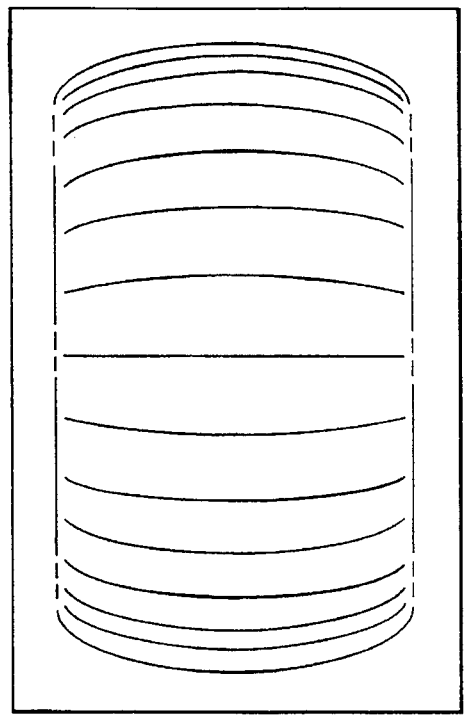
FIG. 3 is a diagrammatic representation of full-field contact force distribution of a tire resulting from the apparatus and method of the present invention.
Figure 4:
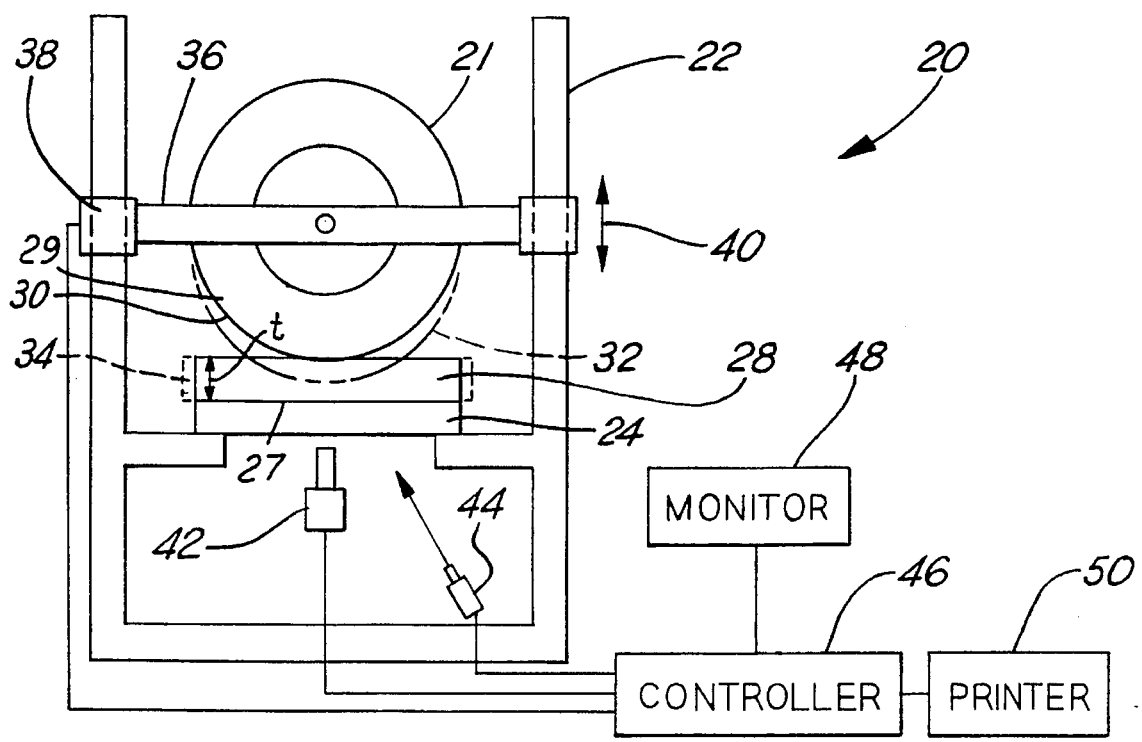
FIG. 4 is a diagrammatic representation of the apparatus of the present invention.

As shown in FIG. 4, apparatus 20 is utilized in measuring the full-field contact force distribution of tire 21, giving the full-field contact force distribution image of FIG. 3. Apparatus 20 includes frame 22, which supports a transparent support member 24 at its edges. Transparent support member 24 is a rigid member having an elasticity which is substantially greater than the elasticity of tire 21 being tested. Thus, for example, rigid support member 24 may be a suitably sized glass plate. Transparent contact member 28 is supported on a substantially smooth bottom surface 27 by support member 24 and serves as a transducer between tire surface 29 of tire 21 and support member 24. Contact member 28 is elastically deformable and has an elasticity substantially less than the elasticity of tire 21. Further, contact member 28 has a thickness, "t", proportional to the elasticity of contact member 28 so that, as tire 21 moves from the position shown at 30 to the position shown in phantom at 32, contact member 28 yields to conform to the shape of tire 21 as shown by the phantom line 34. As would be apparent to one of ordinary skill in the art in view of this disclosure, a relatively thick contact member 28 has a higher elasticity whereas a relatively thin contact member 28 has a lower elasticity.

Tire 21 is mounted to cross member 36, which extends transversely from frame 22 and which is slidably mounted thereto by way of excitation source 38. Excitation source 38 provides a means to press tire 21 against the contact member 28. In a preferred embodiment, excitation source 38 causes tire 21 to oscillate or vibrate relative to frame 22, as shown by arrow 40, so as to provide a dynamic load condition on contact member 28 as will be further discussed hereinafter.

Apparatus 20 further includes imaging device 42—which can be an electronic speckle pattern interferometry camera (typically referred to as TV holography) or a high speed charge-coupled device (CCD) image recording system for post-processing of the information—positioned to view the interface between tire 21 and contact member 28 (hereinafter referred to as the tire-contact member interface) through transparent support member 24 and transparent contact member 28. A light source, such as laser light source 44, is positioned to illuminate the tire-contact member interface through transparent support member 24 and transparent contact member 28. Laser light source 44 may provide visible light or, alternatively, infrared light. In the example shown with reference to FIG. 4, light source 44 and imaging device 42 are positioned beneath support member 24, contact member 28 and tire 21 to illuminate and view the tire-contact member interface, respectively. Accordingly, imaging device receives reflected light from the tire-contact member interface.

In the example disclosed herein, in operation, controller 46 signals excitation source 38 to move tire 21 relative to frame 22 in the direction of arrow 40 such that surface 29 of tire 21 presses into contact member 28. Controller 46 actuates light source 44 to illuminate the tire-contact member interface such that reflected light is viewed by imaging device 42. In a preferred embodiment, the tire-contact member interface is provided with a reflective coating. As such, surface 29 of tire 21 adjacent the contact member 28 may be coated with a reflective coating. Alternatively, the surface of contact member 28 adjacent tire 21 may be coated with the reflective coating. Because contact member 28 comprises a softer material than tire 21, such as an elastomer, contact member 28 displaces due to the pressing of tire 21 therein. Alternatively, contact member 28 may be a transparent fluid filled bag which behaves in a similar manner to the elastomer and which also has an elasticity substantially less than the elasticity of tire 21.

As is well known in the art of interferometry, which includes the measurement of distances, imaging device 42 measures this displacement at the tire-contact member interface. According to the present invention, this information (displacement data) is then transmitted to controller 46. Controller 46 then calculates the contact force using the known elasticity of contact member 28. Thus, the displacement obtained by imaging device 42 is translated by controller 46 into contact force distribution. Also, because contact member 28 displaces completely to conform to the resulting shape of tire 21, a full-field image is viewed and thus full-field contact force distribution can be measured. This full-field contact force distribution may be displayed on monitor 48 as well as printed using printer 50.

In order to obtain a dynamic, full-field contact force distribution, excitation source 38 causes tire 21 to oscillate or vibrate relative to frame 22 and contact member 28 along arrow 40 between a first position 30 and a second position 32. As a result, imaging device 42 measures real-time displacement of the tire-contact member interface. Controller 46 then calculates the contact force distribution, as previously stated, and displays the results on monitor 48 in real-time. Thus, a dynamic, full-field contact force distribution may be measured.

Figure 5:
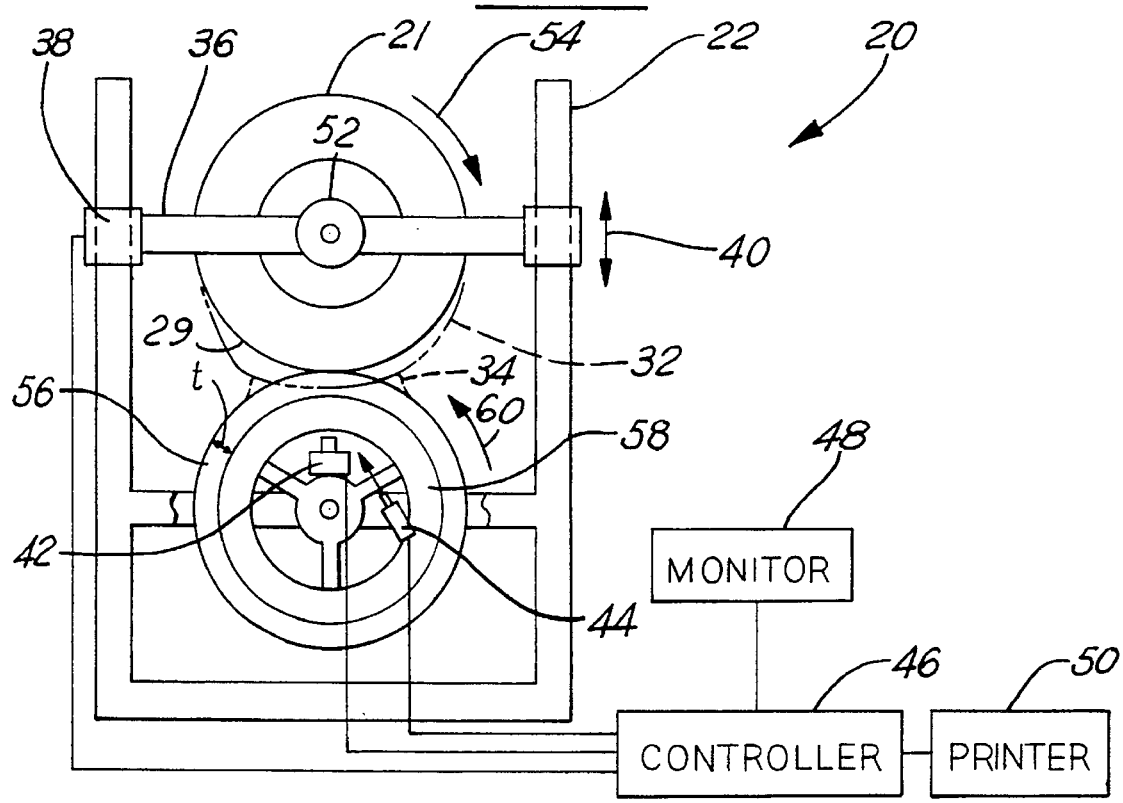
FIG. 5 is a second embodiment of the present invention.

Referring now to FIG. 5, there is shown a second embodiment of the present invention where like elements will be described with like reference numerals. In this embodiment, however, cross member 36 is fitted with a rotation means 52, for example, so that tire 21 is capable of rotating in a direction shown by arrow 54 as well as translating along frame 22 indicated by arrow 40. Transparent, hollow, elastically deformable cylinder 56 (contact member) and transparent, hollow, rigid cylinder 58 (support member) is rotatably attached to frame 22 and which rotates in an opposite direction from tire 21 along arrow 60. Laser light source 44 and imaging device 42 are positioned to illuminate and view the tire-contact member interface through rigid cylinder 58 and elastically deformable cylinder 56, respectively. The operation of apparatus 20 remains the same as discussed with reference to FIG. 4. Thus, full-field, rolling contact force distribution may be obtained.

Figure 6A:
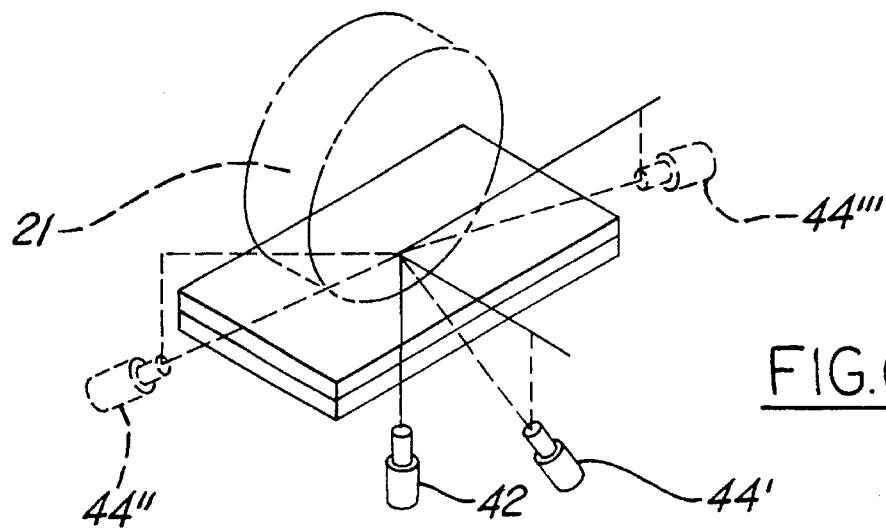
FIGS. 6a–6c are diagrammatic perspective representations of illumination and view angles for measuring contact force distribution in three-dimensions.
Figure 6B:
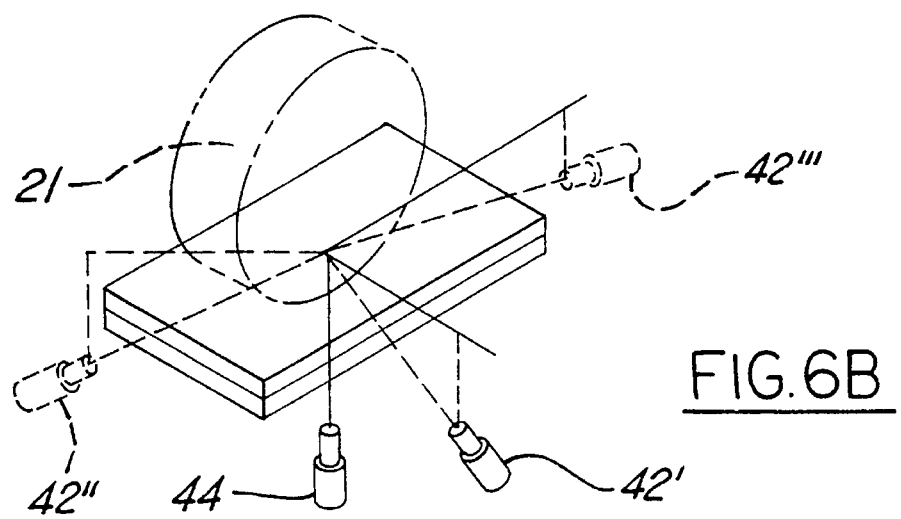
Figure 6C:
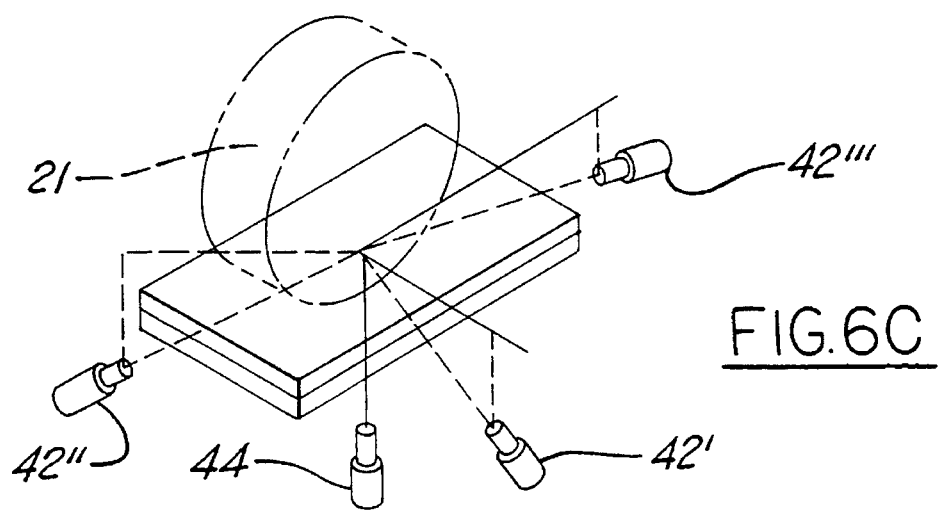

Turning now to FIGS. 6a–6c, the various illumination angles of light emitted form light source 44 and the various view angles of imaging device 42 relative to contact member 28 and support member 24 are shown. It should be noted that for the sake of clarity, tire 21 is shown in phantom. To measure three-dimensional contact force distribution, the angle of illumination of light emitted from laser light source 44 or the view angle of imaging device 42 may be changed during operation of the apparatus 20. Alternatively, three separate light sources or three separate imaging devices may be provided as will become apparent hereinafter.

In particular, referring to FIG. 6a, imaging device 42 measures the displacement of the tire-contact member interface when the light source is in position 44', for example.

Next, the position of the light source is changed, shown at position 44", and again imaging device 42 measures the displacement of the tire-contact member interface. Finally, the position of the light source is changed again, shown at position 44''', and again imaging device 42 measures the displacement of the tire-contact member interface. Thus, displacement in three dimensions may be obtained which then results in the ability of measuring contact force distribution in three dimensions. Alternatively, three separate light sources may be provided, each occupying a different position shown at 44', 44" and 44''', respectively. However, one light source emits light to the exclusion of the other two each time displacement is to be measured by imaging device 42. This process is repeated twice to obtain three-dimensional displacement information.

As would be apparent to one of ordinary skill in the art in view of this disclosure, rather than repositioning a single light source 44 or providing three separate light sources, a single imaging device 42 may be repositioned or three separate imaging devices may be provided. Thus, as best seen in FIG. 6b, a single imaging device 42 may be moved to the positions shown at 42', 42" and 42''', respectively, each time displacement is to be measured. Alternatively, three imaging devices may occupy the positions shown at 42', 42" and 42''', respectively, each measuring displacement to the exclusion of the other two.

To measure dynamic, three-dimensional contact force distribution, three imaging devices, each measuring displacement of the tire-contact member interface at a different angle, is provided. Thus, as seen in FIG. 6c, a single light source 44 is provided while three separate imaging devices, 42', 42" and 42''' are provided In this case, however, the three imaging devices view the tire-contact member interface simultaneously to measure dynamic, real-time, displacement which can then be used to measure contact force distribution, as previously discussed, dynamically.

While the best mode in carrying out the invention has been described in detail, those having ordinary skill in the art in which this invention relates will recognize various alternative designs in embodiments, including those mentioned above, in practicing the invention that has been defined by the following claims.

We claim:

1. An apparatus for measuring a full-field contact force distribution of a tire, comprising:

a transparent, rigid, support member having an elasticity substantially greater than the elasticity of the tire;

a transparent, elastically deformable, contact member having a substantially smooth first surface, said support member supporting said first surface of said contact member and said tire, said contact member having an elasticity substantially less than the elasticity of the tire;

an excitation source coupled to the tire for pressing a tire surface against a second surface of said contact member opposite said first surface, thereby compressing said contact member between the tire surface and said support member so as to provide a tire-contact member interface;

a laser light source positioned to illuminate said interface through said support member and said contact member;

an imaging device positioned to receive reflected light from said interface, said imaging device measuring displacement of said tire-contact member interface when the tire surface is pressed against said second surface of said contact member; and, a controller for receiving displacement data from said imaging device, with said controller thereafter calculating contact force distribution of said tire throughout said tire-contact member interface from said received displacement data so as to provide said full-field contact force distribution.

2. An apparatus as claimed in claim 1 wherein said controller actuates said excitation source.

3. An apparatus as claimed in claim 2 wherein said controller actuates said excitation source to vibrate the tire so as to vary the amount of compressive force exerted on said second surface of said contact member by the tire surface.

4. An apparatus as claimed in claim 1 further comprising a video display monitor coupled to said controller for displaying the results of said calculation on said monitor.

5. An apparatus as claimed in claim 1 wherein said apparatus measures contact force distribution in three-dimensions.

6. An apparatus as claimed in claim 1 wherein said laser light source generates one of infrared and visible light.

7. An apparatus as claimed in claim 1 further comprising a means for rotating the tire and said contact member relative to each other.

8. An apparatus as claimed in claim 1 wherein said imaging device is one of an electronic speckle pattern interferometry imaging device and a high speed charge-coupled device.

9. An apparatus as claimed in claim 1 wherein said second surface of said contact member is coated with an optically reflective coating.

10. An apparatus as claimed in claim 1 wherein said contact member is one of an elastomer and a fluid filled transparent bag.

11. An apparatus for measuring full-field rolling contact force distribution of a tire comprising:

a frame, with the tire being rotatably mounted to said frame;

a transparent, hollow, rigid cylinder rotatably mounted to said frame;

a transparent, hollow, elastically deformable cylinder supported on an outer cylindrical surface of said rigid cylinder, said elastically deformable cylinder having an elasticity substantially less than the elasticity of the tire;

an excitation source coupled to the tire for vibrating the tire so as to variably press a tire surface against an outer cylindrical surface of said elastically deformable cylinder, thereby compressing said elastically deformable cylinder between the tire and said rigid cylinder so as to provide a tire-contact member interface;

a rotation means for rotating the tire;

a laser light source positioned to illuminate said interface through said rigid cylinder and said elastically deformable cylinder;

an electronic speckle pattern interferometry imaging device positioned to receive reflected light from said interface, said imaging device measures displacement of said tire-contact member interface when the tire surface is pressed against said outer cylindrical surface of said elastically deformable cylinder and rotates relative thereto;

a controller for actuating said excitation source and for receiving displacement data from said imaging device, with said controller thereafter calculating contact force distribution of said tire throughout said tire-contact member interface from said received displacement data so as to provide said full-field rolling contact force distribution; and, a video display monitor coupled to said controller for displaying the results of said calculation on said monitor.

12. A method for measuring full-field contact force distribution of a tire comprising the steps of:

positioning a substantially smooth first surface of a transparent, elastically deformable, contact member on a transparent, rigid, support member, said contact member having an elasticity substantially less than the elasticity of the tire, said support member having an elasticity substantially greater than the elasticity of the tire;

pressing a tire surface against a second surface of said contact member opposite said first surface thereby compressing said contact member between the tire surface and said support member and defining a tire-contact member interface between the tire surface and said second surface of said contact member;

illuminating said interface through said support member and said contact member with a laser light source;

imaging said interface with an imaging device so as to receive reflected light from said interface, thereby measuring displacement of said interface when the tire surface is pressed against said second surface of said contact member; and, calculating contact force distribution of said tire throughout said interface from displacement data measured during said imaging step so as to provide said full-field contact force distribution.

13. A method as claimed in claim 12 further comprising the step of providing said interface with an optically reflective coating.

14. A method as claimed in to claim 13 wherein said providing said interface with an optically reflective coating step comprises the step of coating said second surface of said contact member with said optically reflective coating.

15. A method as claimed in claim 13 wherein said providing said interface with an optically reflective coating step comprises the step of coating the tire surface with said optically reflective coating.

16. A method as claimed in claim 12 wherein said pressing step comprises the step of vibrating the tire so as to vary the amount of compressive force exerted on said second surface of said contact member by the tire surface.

17. A method as claimed in claim 12 further comprising the steps of rotating the tire and said contact member relative to each other.

18. A method as claimed in claim 12 further comprising the step of displaying the results of said calculation on a video display monitor.

19. A method as claimed in claim 12 further comprising the step of positioning one of said imaging device and said light source at three different angles so as to measure three-dimensional contact force distribution.

* * * * *